United States Patent [19]
Kim

[11] Patent Number: 5,239,692
[45] Date of Patent: Aug. 24, 1993

[54] RADIO FREQUENCY TRANSMITTER CAPABLE OF SENSING ABNORMAL STATE FOR USE IN A WIRELESS SECURITY SYSTEM

[75] Inventor: Hong-Myung Kim, Seoul, Rep. of Korea

[73] Assignee: SamSung Electronics Co., Ltd., Suweon, Rep. of Korea

[21] Appl. No.: 431,179

[22] Filed: Nov. 3, 1989

[30] Foreign Application Priority Data

Jul. 21, 1989 [KR] Rep. of Korea ................ 1989-10383

[51] Int. Cl.$^5$ ............................................. H04B 1/04
[52] U.S. Cl. ..................................... 455/115; 455/127
[58] Field of Search .................. 455/67, 115, 117, 127, 455/226

[56] References Cited

U.S. PATENT DOCUMENTS

| | | | |
|---|---|---|---|
| 4,521,912 | 6/1985 | Franke et al. | 455/115 |
| 4,649,569 | 3/1987 | Kennon et al. | 455/115 |
| 4,924,211 | 5/1990 | Davies | 455/67 |

Primary Examiner—Curtis Kuntz
Attorney, Agent, or Firm—Robert E. Bushnell

[57] ABSTRACT

There is disclosed a radio frequency transmitter for use in a wireless security system, which can sense abnormal state occurred in an objective equipment, by monitoring both the abnormal state and voltage supplied thereto. The invention also transmits the radio frequency for a given short period so as to save the power. The transmitter for carrying out those objects includes an address unit 110 for designating a specific address having a plurality of bits according to each objective equipment; an encoder 120 for coding each bit of the specific address which is designated when an abnormal state is occurred and producing a specific code data in series; an RF transmitter 130 for modulating said specific code data into a radio frequency in form of analog signal and amplifying said data to be suitable for transmitting; a sensor 100 for sensing the abnormal state occurred to the objective equipment; a power source sensor 140 for sensing a state of battery supplying voltage source to the entire system, and providing a logic data to the encoder in response to the state of the battery; a system driver 150 for driving the radio frequency transmitter and the encoder in response to the output data of the sensor and the power source sensor; and a driving controller 160 for restricting within a given period the transmission of the radio frequency when the abnormal state is detected.

10 Claims, 2 Drawing Sheets

RADIO FREQUENCY TRANSMITTER CAPABLE OF SENSING ABNORMAL STATE FOR USE IN A WIRELESS SECURITY SYSTEM

BACKGROUND OF THE INVENTION

This invention generally relates to a radio frequency transmitter which transmits a radio frequency signal when an abnormal state is occurs to an objective equipment included in a wireless security system, by monitoring the operational state thereof, and more particularly to a radio frequency transmitter which transmits the radio frequency signal for a given short period when the abnormal state is detected, by monitoring not only the abnormal state but also the drop of power supplied thereto.

In general, the wireless security system includes a plurality of the radio frequency transmitters for transmitting the radio frequency signal in the event that the abnormal state of the power with the radio frequency transmitters, and a central processing unit (CPU) for receiving the radio frequency transmitted from the radio frequency transmitters and controlling the objective equipment to which the abnormal state is occurred so as to operate in normal state.

Known radio frequency transmitter usually transmits the radio frequency signal carrying a specific code data, at the time that the abnormal state is detected. However, in the case that the power supply of battery loaded thereto is too low to operate the system, the transmitter can not detect the abnormal state or transmit the proper radio frequency because a function for monitoring the status of the battery is not prepared to the known system. Therefore, erroneous operation may occur frequently. Furthermore, the known transmitter is disadvantageous in that users must check the status of battery periodically and change the batteries in order to prevent the erroneous operation caused by lack of the power. A further disadvantage of the known transmitter is that the radio frequency signal resulted by detection of the abnormal state occurred to the objective equipment is continuously transmitted until a proper action is taken to the objective equipment, to recover from the abnormal state, which causes large power consumption.

SUMMARY OF THE INVENTION

It is accordingly an object of the present invention to provide a radio frequency transmitter capable of performing accurately the operation of detecting the abnormal state and minimizing the power consumption not only by monitoring the abnormal state but also by transmitting for a given short period the radio frequency carrying a specific code data individually of each radio frequency transmitter in a wireless security system.

According to an aspect of the invention, the improvement includes an address unit for designating a specific address having a plurality of bits according to each objective equipment; an encoder for coding each bit of the specific address which is designated when an abnormal state is occurred and producing a specific code data in series; a sensor for sensing the abnormal state occurred to the objective equipment; a power source sensor for sensing a state of battery supplying voltage source to the entire system, and providing a logic data to the encoder in response to the state of the battery; a system driver for driving the radio frequency transmitter and the encoder in response to the output data of the sensor and the power source sensor; and a driving controller for restricting within a given period the transmission of the radio frequency when the abnormal state is detected.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

An embodiment of the invention will now be described hereinbleow in detail with reference to the accompanying drawings, by way of only example.

Figure 1:
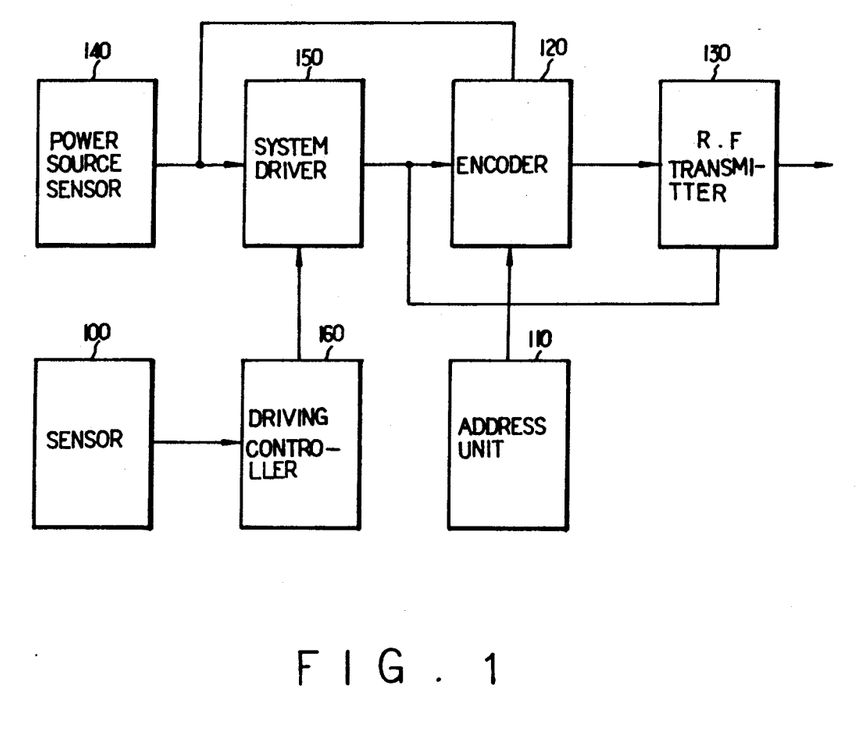
FIG. 1 shows schematically a block diagram of the radio frequency transmitter for carrying out the present invention.

Referring now to FIG. 1, there is shown a block diagram of the radio frequency transmitter according to the invention. As apparent from the drawing, an address unit 110 addresses a specific address comprised of a plurality of bits according to each objective equipment. An encoder 120 then generates a specific code data in series by coding the bits of the specific address outputted from the address unit 110 in case the abnormal state is occurred. The specific code data of the encoder 120 is modulated with a high frequency in form of analog signal and amplified by a radio frequency (RF) transmitter 130 to produce the radio frequency signal of course, the abnormal state will be sensed by sensor 100 and outputted to driving controller 160 for controlling the system driver 150. Meanwhile, power source sensor 140 detects the state of battery which provides the entire system with power and at the same time generates to the encoder 120 the logic data established by change of the power source so as to set up the specific address in response to the change of power. The logic data from the power source sensor 140 and the output of the sensor 100 passed through the driving controller 160 are applied to the system driver 150 which drives the encoder 120 and the RF transmitter 130 in response to the above signals. In addition, the driving controller 160, connected between the sensor 100 and the system driver 150, restricts the transmission of the RF signal within a predetermined period in case the abnormal state is sensed by the sensor 100 and the power source sensor 140.

According to the embodiment, the sensor 100, which is to detect the abnormal state of the objective equipment included in the wireless security system by monitoring the state of the objective equipment, generates logic high or logic low data to the driving controller 160 according to the state of the objective equipment. The sensor 100 may be freely chosen on the basis of the kind of objective equipment or the purpose of application.

In the mean while, the power source sensor 140 inverses the existing logic state which has been held and outputs it to the system driver 150 and the encoder 120 in case that voltage of the battery is lowered below a given voltage level, according to the result of monitoring power source.

In response to the logic data applied from the sensor 100, the driving controller 160, when the abnormal state is occurred to the objective equipment, applies to the system driver 150 a driving control signal in form of a pulse train with a constant width.

Thereafter, the system driver 150, responding to the logic data applied from the power source sensor 140 in case that the voltage of the battery is lowered below the given voltage level, controls the RF transmitter 130 and the encoder 120 to be operated according to the logic data, or the system driver 150, responding to the driving control signal of the driving controller 160 resulted by the output of the sensor 100 in case that the abnormal state is detected by the sensor 100, controls the RF transmitter and the encoder 120 to operate for a given period.

On the other hand, the address unit 110 applies to the encoder 120 the specific address comprised of a plurality of bits which is set up in advance by the manufacturer or user. The specific address is recognizing data given to the equipments each and is dependent upon the purpose of the applications.

Then, the encoder 120, which starts operating when the abnormal state is occurred or the voltage of the battery is lowered, under the control of the system driver 150, generates the specific code data in series to the RF transmitter 130 by coding sequentially the logic data of the specific address outputted from the power source sensor 140 and the each bit's logic state of the specific address outputted, according to the equipments, from the address unit 110.

The RF transmitter 130 which receives the specific code data of the encoder 120 operates to modulate and amplify the specific code data into the radio frequency in form of analog signal which is to be transmitted just in case that the abnormal state is occurred or the voltage of the battery is relatively lowered.

Figure 2:
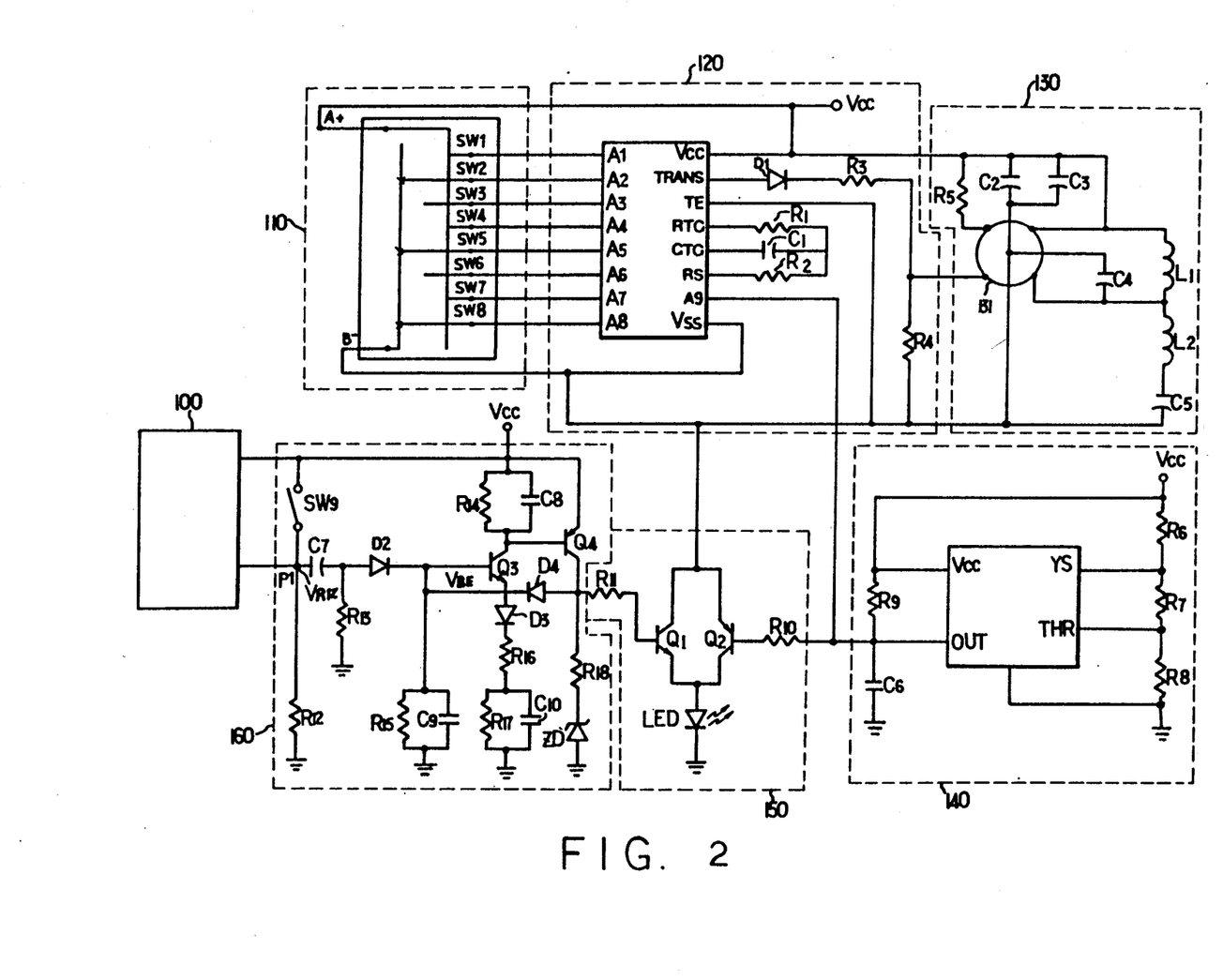
FIG. 2 shows a circuit diagram for carrying out an embodiment of the invention.

Referring to FIG. 2, it is an embodiment of the invention. Throughout the specification like numerals represents like objects and functions. As shown in FIG. 2, the sensor 100 is connected to the driving controller 160 which is comprised of a plurality of resistors $R_{12}$-$R_{18}$, capacitors $C_7$-$C_{10}$, two transistors $Q_3$, $Q_4$, three diodes $D_2$-$D_4$, a zener diode ZD, and a switch $SW_9$. The output terminal of the driving controller 160 is then connected to the input terminal of the system driver 150 which is comprised of two transistors $Q_1$, $Q_2$, two resistors $R_{11}$, $R_{10}$, and emitting diode LED. To another input terminal of the system driver 150 is connected the output terminal of the power source sensor 140 which is comprised of resistors $R_6$-$R_9$, a capacitor $C_6$, and a voltage detector 141. In addition, the output terminal of the system driver 150 is connected to the encoder 120 which is comprised of a diode $D_1$, resistors $R_1$-$R_4$, a capacitor $C_1$, and a remote control encoder 121. Also, to the encoder 120 is connected through a plurality of address lines the address unit 110 which is comprised of a plurality of switches $SW_1$-$SW_8$. Meanwhile, the output of the encoder 120 is connected to the RF transmitter 130 which is comprised of a resistor $R_5$, capacitors $C_2$-$C_5$, inductors $L_1$, $L_2$, and a micro-transmitter 131.

More detailed description taken in connection with FIG. 2 will now be made to show how the objects and features of the embodiment is achieved, according to the invention.

First, the sensor 100 senses the state of the objective equipment and generates to the system driver 150 through the driving controller 160 the logic low signal when the objective equipment is in the normal state or generates the logic high signal when the abnormal state is occurred to the objective equipment.

According to the embodiment, in the driving controller 160, the resistor $R_{12}$ is connected between an output terminal of the sensor 100 and the ground level so as to form a current path in the event that the sensor 100 is excited. A node $P_1$ which is the connection point of the resistor $R_{12}$ and the output of the sensor 100 is connected to the capacitor $C_7$ which is connected in series to the diode $D_2$. To cathode of the diode $D_2$ is connected the base of the transistor $Q_3$ whose collector is connected to the supply voltage Vcc through the resistor $R_{14}$ and capacitor $C_8$ which are connected in parallel. At the same time, to the collector of the transistor $Q_3$ is connected the base of the transistor $Q_4$ whose emitter is connected to the supply voltage Vcc and whose collector is coupled with the input of the system driver 150.

The base of the transistor $Q_3$ is coupled with cathode of the diode $D_4$ whose anode is connected to the collector, which is at the same time the output terminal of the driving controller, of the transistor $Q_4$. Between the transistor $Q_3$ and the ground, the diode $D_3$ whose anode is connected to the emitter of the transistor $Q_3$, the resistor $R_{16}$, and a pair of parallel-connected resistor $R_{17}$ and capacitor $C_{10}$ are connected in series. And, the switch $SW_9$ coupled between the supply voltage Vcc and the node $P_1$ is to test the operation of the driving controller 160, manually. Moreover, the capacitor $C_7$, the resistor $R_{13}$, and the diode $D_2$ connected between the node $P_1$ and the base of the transistor $Q_3$ are used to detect the fine output (i.e., instantaneous output) of the sensor 100.

Likewise, the resistor $R_{15}$ and the capacitor $C_9$ connected in parallel between base of the transistor $Q_3$ and the ground level are to supply stable bias voltage to the transistor $Q_3$. The resistor $R_{14}$ and capacitor $C_8$ connected in parallel between the supply voltage Vcc and collector of the transistor $Q_3$ are to restrict collector current to a given level as well as prevent transient phenomenon of the transistors $Q_3$, $Q_4$, during the operation.

On the other hand, between emitter of the transistor $Q_3$ and the capacitor $C_{10}$, the diode $D_3$ and the resistor $R_{16}$ are connected in series and the resistor $R_{17}$ is connected in parallel to the capacitor $C_{10}$ so as to not only apply a predetermined voltage level to the emitter of the transistor $Q_3$ but also discharge the voltage charged into the capacitor $C_{10}$ through the resistor $R_{17}$. To set up the emitter voltage of the transistor $Q_4$, the resistor $R_8$ and the zener diode ZD are also connected in series between the ground level and collector of the transistor $Q_4$.

As for the operation of the driving controller 160, the sensor 100 which is connected in series between the supply voltage Vcc and the ground level through the resistor $R_{12}$ is a normal-open type. Namely, it is opened in normal state so that the current path from the supply voltage Vcc to the ground level through the resistor $R_{12}$ is normally cut off. If, however, the abnormal state is occurred to the objective equipment, then the sensor 100 is electrically closed causing a voltage $VR_{12}$ dropped by the resistor $R_{12}$ on the node $P_1$.

Therefore, the transistor $Q_3$ is electrically turned on by tho voltage $VR_{12}$ on the node $P_1$ supplied through the diode $D_2$ and the capacitor $C_7$, which causes the collector voltage to be dropped abruptly. At about this time, the capacitor $C_{10}$ begins to charge the emitter current of the transistor $Q_3$ supplied through the diode $D_3$ and the resistor $R_{16}$. Accordingly, the transistor $Q_4$ is turned on and outputs logic high signal to a first input terminal of the system driver 150, through collector of the transistor $Q_4$, because the voltage on base of the transistor $Q_4$ which is connected to collector of the transistor $Q_3$ becomes lower than that of emitter thereof. The diode $D_4$ provides base of the transistor $Q_3$ with the collector voltage of the transistor $Q_4$ in order to keep the transistor $Q_3$ in turn-on state.

While the transistors $Q_3$, $Q_4$ remains in the turn-on state, the capacitor $C_{10}$ is continuously charged by the emitter current of the transistor $Q_3$ and increases the emitter voltage of the transistor $Q_3$ little by little. Thereafter, if the voltage VBE between base and emitter becomes lower than the active voltage 0.7 V (which is the least voltage to operate the transistor in active region), then the transistor $Q_3$ changes its state into turn-off. At the same time, the collector voltage of the transistor $Q_3$ increases abruptly so that the transistor $Q_4$ is turned off at the point that the voltage VBE is below the active voltage. Therefore, the logic low signal is supplied to the first input terminal of the system driver 150. In this manner, the driving controller 160 generates to the system driver 150 one complete pulse having a given width, when the abnormal state is sensed by the sensor 100.

The power source sensor 140 which is comprised of the resistors $R_6$-$R_9$, the capacitor $C_6$, and the voltage detector 141 monitors the supply voltage Vcc of the battery so as to output logic low data in case that the supply voltage Vcc is lowered below the predetermined voltage level, or, otherwise, output logic high data in the normal state. The logic data is to be applied to the encoder 120 and a second input terminal of the system driver 150.

To put it concretely, the voltage detector 141 detects the maximum allowable voltage and the minimum allowable voltage to generate logic low data for the voltage applied which is higher or lower than the maximum allowable voltage or the minimum allowable voltage, respectively, or generate logic high data in case that the voltage of the battery is within the allowable voltage. The maximum and minimum allowable voltage are determined by the resistors $R_6$-$R_8$ and the resistor $R_9$ is used as a pull-up resistor to pull up the output voltage when the logic high signal is generated by the voltage detector 141. Furthermore, the capacitor $C_6$ is to eliminate the noises from the voltage detector 141.

According to the embodiment, the maximum allowable voltage of the voltage detector 141 is $$V_{max} = \left[ \frac{R7 + R8}{R6 + R7 + R8} \times 1.15 + 0.1 \right] (\text{volt}) \quad (1)$$

Also, the minimum allowable voltage is $$V_{min} = \frac{R8}{R6 + R7 + R8} \times 1.15 \, (\text{volt}) \quad (2)$$

The maximum allowable voltage, however, is not so important, in this invention, as the minimum allowable voltage which is effective to monitor the voltage consumption of the battery.

Hence, the system driver 150, comprised of the light emitting diode LED, the resistors $R_{10}$, $R_{11}$, and the transistors $Q_1$, $Q_2$, provides the current path formed from the ground level towards the encoder 120 and the RF transmitter 130, when the logic high signal is applied through the first input terminal from the driving controller 160, or when the logic high signal is applied through the second input terminal from the power source sensor 140. Therefore, with the current path provided, the encoder 120 and the RF transmitter 130 are to operate and inform the user of the abnormal state.

In other words, the transistor $Q_1$ is turned on when the logic high data is applied from the driving controller 160, so that the current path is formed, through the transistor $Q_1$ and the LED, from the ground level towards the address unit 110 and the encoder 120 as well as the RF transmitter 130. In this case, the light emitting diode LED is lighted by the current supplied through the transistor $Q_1$ from the encoder 120 or the RF transmitter 130.

In similar way, the transistor $Q_2$ is turned on when the logic low signal is applied from the power source sensor 140. So, the current path is now formed from the ground level to the encoder 120 and the address unit 110 as well as to the RF transmitter 130. Through the transistor $Q_2$. At this time, the LED is lighted by the current supplied from the encoder 120 or the RF transmitter 130 through the transistor $Q_2$.

On the other hand, the address unit 110, comprised of eight three-state switch $SW_1$-$SW_8$, outputs to the encoder 120 the specific address of eight bits established by the user or manufacturer. Each bit of the specific address has one of the three states ranging through the logic low state, the logic high state, and a high impedance state, according to the adjustment of the user or manufacturer.

The encoder 120, comprised of the capacitor $C_1$, the resistors $R_1$-$R_4$, and the remote control encoder 121, produces to the RF transmitter 130 the code data in series according to the logic data outputted from the power source sensor 140 or the specific address data applied from the address unit 110, in the event that the current path is formed through the transistors $Q_1$ or $Q_2$, and the LED.

In other words, the remote control encoder 121 scans sequentially, one bit by one bit, the logic data for detecting the state of battery which is applied from the power source sensor 150 and 8-bit specific address which is set by the address unit 110, by which the remote control encoder 121 converts said data received into a serial code data in form of a pulse train having a different width. The pulse width is determined by the resistors $R_1$, $R_2$ and capacitor $C_1$. However, the resistors $R_3$, $R_4$ operating as a voltage divider divides the voltage level of the serial code data outputted from the remote control encoder 121 and provides it to the RF transmitter 130.

In addition, the RF transmitter 130 comprised of the micro-transmitter 131, the resistor $R_5$, the inductors $L_1$, $L_2$ and the capacitors $C_2$-$C_5$ modulates the serial code data inputted from the encoder 120 when the current path is formed through the transistor $Q_1$ or $Q_2$ and the LED to the ground level. Thereafter, the modulated code data is transmitted to a central processing unit (not shown).

In other words, the micro-transmitter 131 which is operated when the logic low data as an enable signal is applied mixes the serial code data inputted from the encoder 120 with a high frequency which is generated within the micro-transmitter. Thus, the code data is modulated into an ultra high frequency (UHF) band, and the modulated signal is amplified to be transmitted to the central processing unit. Further, the inductors $L_1$, $L_2$ and the capacitor $C_5$ are used to adjust the impedance of the antenna (not shown) and may be adjusted properly to get optimum impedance. However, the resistor $R_5$ and the capacitors $C_2$–$C_4$ are to provide a stable voltage source to the micro-transmitter 131 during its operation.

The specific address outputted from the address unit 110 is to designate the kinds of the equipments and the purpose of the application and has three-state logic. It is to extend the number of the objective equipments and purpose of the application by assigning the specific address of a given bit (preferably eight bits). In this case, the available number $N_3$ of the equipments is therefore $$N_3 = 3^8 = 6,561 \qquad (3)$$

However, in case that the two-state logic is used the available number $N_2$ of the equipments is $$N_2 = 2^8 = 256 \qquad (4)$$

As apparent from the equations (3) and (4), about twenty-four times of the objective equipments can be increased in number by using the three-state logic data. Therefore, one central processing unit can cover about twenty-four times more of the equipments than when the two-state logic data is used.

Moreover, the logic data outputted from the power source censor 140 to monitor the state of battery indicates whether the battery is in the abnormal state or not, according to its logic state. Namely, the logic high state indicates that the battery is in normal state, while the logic low state indicates that the voltage of the battery is dropped below the minimum allowable voltage which is the abnormal state.

As described above, it will be understood that the improved radio frequency transmitter can operate properly in normal state at any time, by monitoring independently the state of voltage source equipped within the radio frequency transmitter. Therefore, there is no need for checking the battery of the radio frequency transmitter, periodically. In addition, the inventive device is advantageous in that the number of the objective equipments can be easily extended by using the specific address of the three-state logic bits and that the power consumption is minimized by transmitting the radio frequency for a given short period when the abnormal state is occurred.

While the invention has been particularly shown and described with reference to a preferred embodiment , it will be understood by those skilled in the art that modifications in detail may be made without departing from the spirit and scope of the invention.

All of the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the subconstructions of any apparatus so disclosed.

What is claimed is:

1. A radio frequency transmitter in a wireless security system for monitoring equipment, said radio frequency transmitter comprising;
    designate means for designating a specific address having a plurality of bits according to an objective equipment;
    encoder means for encoding each bit of the specific address designated when an abnormal state is detected to provide specific code data in dependence upon said specific address;
    transmitter means for modulating and amplifying said specified code data to provide a radio frequency signal suitable for transmission;
    sensor means or detecting said abnormal state to provide a first logic state representative of said abnormal state;
    power source sensor means for sensing a state of battery supplying voltage source to provide a second logic state to said encoder means, said second loic state representing the state of battery;
    system driver means for driving said transmitter means and said encoder means in response to one of said first logic state and said second logic state; and
    driving controller means for restricting within a given period the transmission of said radio frequency signal when said abnormal state is detected.

2. The radio frequency transmitter according to claim 1, wherein said driving controller means comprises:
    first and second input terminals coupled to said sensor means for receiving said first logic state representative of said abnormal state of said objective equipment;
    a plurality of resistors comprising first, second, third and fourth resistors;
    a plurality of capacitors comprising first and second capacitors;
    a first transistor having a collector connected to ground via said first resistor and a zener diode, a base connected to said battery supply voltage source via said first capacitor in parallel with said second resistor nd an emitter connected to said battery supply voltage source and said first input terminal;
    a second transistor having a collector connected to the base of said first transistor;
    a first diode having a cathode connected to the base of said second transistor, and an anode connected to the collector of said first transistor;
    a second diode having an anode connected to the mitter of said second transistor, and a cathode grounded via said second capacitor in parallel with said third resistor;
    a third diode having a cathode connected to the base of said second transistor; and
    means for restricting said first logic state representative of said abnormal state within a given time to provide an intermediate logic state and applying said intermediate logic state to an anode of said third diode, said restricting means comprising:
        said fourth resistor interposed between said second input terminal and ground, for providing a current path when said first logic state is received; and switching means interposed between said first and second input terminals, for enabling and disabling said driving controller means.

3. A radio frequency transmitter as claimed in claim 1, wherein said system driver means comprises:
- a first transistor having a base coupled to receive said first logic state representative of said abnormal state via said driving controller means;
- a second transistor having a base coupled to receive said second logic state representative of the state of said battery supply voltage source;
- a light-emitting diode having a cathode connected to a collector of said second transistor and an emitter of said first transistor and an anode connected to ground; and
- an output node formed at a junction between a collector of said first transistor and an emitter of said second transistor, for providing a driving control signal in dependence upon reception of one of said first logic state and said second logic state.

4. A radio frequency transmitter as claimed in claim 3, wherein said designate means comprises eight three-state switches for designating said specific address having eight bits in response to said driving control signal.

5. A radio frequency transmitter in a wireless security system for monitoring equipment, said radio frequency transmitter comprising:
- a sensor for sensing an abnormal state occurring to the equipment being monitored to provide a first logic state representative of said abnormal state;
- a driving controller responsive to said sensor for controlling a system driver;
- a power source sensor for monitoring a power source of said radio frequency transmitter and for providing a second logic state the preventative of a low power signal to said system driver;
- said system driver comprising:
  - a first transistor having a base coupled to receive said first logic state representative of said abnormal state via said driving controller means;
  - a second transistor having a be coupled to receive said second logic state representative of said low power signal;
  - a light emitting diode having a cathode connected to a collector of said second transistor and an emitter of said first transistor and an anode connected to ground; and an output node formed at a junction between a collector of said first transistor and an emitter of said second transistor, for providing a driving control signal in dependence upon reception of one of said first logic state and second logic stage;
- a plurality of three-state switches responsive to said driving control signal for providing an address signal to an encoder;
- said encoder being responsive to said driving control signal for receiving and encoding said low power signal and said address signal, and for generating a serially conceded data signal; and
- transmitter means responsive to said driving control signal for amplifying and modulating said serially encoded data signal for transmission.

6. A radio frequency transmitter as claimed in claim 3, wherein said driving controller comprises:
- first and second input terminals coupled to said sensor for receiving said first logic state representative of said abnormal state;
- a plurality of resistor comprising first, second, third and fourth resistors;
- a plurality of capacitors comprising first and second capacitors;
- first transistor having a collector connected to ground via said first resistor and a zener diode, a base of said first transistor being connected to a voltage source via said first capacitor in parallel with said second resistor, and an emitter of said first transistor being connected to said voltage source and said first input terminal;
- a second transistor having a collector connected to the base of said first transistor;
- a first diode having a cathode connected to the base of said second transistor, and an anode connected to the collector of said first transistor;
- a second diode having an anode connected to the emitter of said second transistor, and a cathode grounded via said second capacitor in parallel with said third resistor;
- a third diode having a cathode connected to the base of said second transistor; and
- means for restricting said first logic state representative of said abnormal state within a given time to provide an intermediate logic state, and applying said intermediate logic state to an anode of said third diode, said restricting means comprising:
  - said fourth resistor interposed between said second input terminal and ground, for providing a current path when said first loic state is received; and
  - switching means interposed between said first and second input terminals and said power source, for for grounding currents from said first and second input terminals.

7. A radio frequency transmitter in a wireless security system for monitoring equipment, said radio frequency transmitter comprising;
- first sensor means or detecting an abnormal state arising from a designated equipment to provide a first logic signal representative of said abnormal state;
- first driver means coupled to receive said first logic signal, for providing an intermediate signal representative of said first logic signal by restricting said first logic signal within a given period in dependence upon reception of said first logic signal;
- second sensor means for monitoring a power source of said radio frequency transmitter to provide a second logic signal indicative of said power source being lower than a threshold value;
- system driver mean coupled to receive said first logic signal and said second logic signal, for providing a driving control signal by a series of pulses of constant width, in dependence upon reception of one of said first logic signal and said second logic signal;
- address means responsive to said driving control signal, for designating a specific address having a plurality of bits compatible to said designated equipment;
- encoder means responsive to said driving control signal and said second logic signal, for encoding said specific address to provide a serially encoded signal; and
- transmitter means responsive to said driving control signal, formulating said serially encoded signal to provide a radio-frequency signal.

8. The radio frequency transmitter as claimed in claim 78, wherein said first driver means comprises:
- first and second input terminals coupled to said sensor for receiving said first logic state representative of said abnormal state;
- a plurality of resistors comprising first, second, third and fourth resistor;
- a plurality of capacitors comprising first and second capacitors;
- a first transistor having a collector connected to ground via said first resistor and a zener diode, a base of said first transistor being connected to a voltage source via said first capacitor in parallel with said second resistor, and an emitter of said first transistor being connected to said voltage source and said first input terminal;
- a second transistor having a collector connected to the base of said first transistor,
- a first diode having a cathode connected to the base of said second transistor, and an anode connected to the collector of said first transistor;
- a second diode having an anode connected to the emitter of said second transitory and a cathode grounded via said second capacitor in parallel with said third resistor;
- a third diode having a cathode connected to the base of said second transistor; and
- means for providing an intermediate logic state in dependence upon a determination of said first logic sate representative of said abnormal state within a given time, and applying said intermediate logic state to an anode of said third diode, said restricting means comprises:
  - said fourth resistor interposed beween said second input terminal and ground, for providing a current path when said first logic state is received; and
  - switching means interposed between said first and second input terminals and said power source, for grounding currents from said first and second input terminals.

9. The radio frequency transmitter as claimed in claim 7, wherein said second driver means comprises:
- a first transistor having a base coupled to receive said first logic state representative of said abnormal state via said driving controller means;
- a second transistor having a base coupled to receive said second logic state representative of the state of said battery supply voltage source;
- a light-emitting diode having a cathode connected to a collector of said second transistor and an emitter of said first transistor and an anode connected to ground; and
- an output node formed at a junction between a collector of said first transistor and an emitter of said second transistor, for provident a driving control signal in dependence upon reception of one of said first logic state and said second logic stage.

10. A radio frequency transmitter as claimed in claim 9, wherein said address means comprises eight three-stage switches for designating said specific address having eight bits in response to said driving control signal.

* * * * *

UNITED STATES PATENT AND TRADEMARK OFFICE
CERTIFICATE OF CORRECTION

PATENT NO. : 5,239,692
DATED : 24 August 1993
INVENTOR(S) : Hong-Myung KIM

It is certified that error appears in the above-identified patent and that said Letters Patent is hereby corrected as shown below:

IN THE CLAIMS

Column 8,

Line 15,     change "specified" to --specific--;

Line 17,     change "or" to --for--;

Line 23,     change "loic" to --logic--;

Line 45,     change "nd" to --and--;

Line 54,     change "mitter" to --emitter--.

Column 9,

Line 35,     change "the preventative" to --representative--

Line 42,     change "be" to --base--;

Line 45,     insert a hyphen --_-- after "light";

Line 60,     change "conceded" to --encoded--;

Line 65     change "claim 3" to --claim 5--.

UNITED STATES PATENT AND TRADEMARK OFFICE
CERTIFICATE OF CORRECTION

PATENT NO. : 5,239,692
DATED : 24 August 1993
INVENTOR(S) : Hong-Myung KIM It is certified that error appears in the above-identified patent and that said Letters Patent is hereby corrected as shown below:

Column 10

Line 1,     change "resistor" to --resistors--;

Line 5,     insert --a-- before "first";

Line 30,     change "loic" to --logic--;

Line 38,     change ";" to --:--;

Line 52,     change "mean" to --means--;

Line 67,     change "formulating" to --for modulating--.

Column 11

Line 2,     change "78" to --7--;

Line 18,     change " ' " to --;--

UNITED STATES PATENT AND TRADEMARK OFFICE
CERTIFICATE OF CORRECTION

PATENT NO. : 5,239,692
DATED : 24 August 1993
INVENTOR(S) : Hong-Myung Kim It is certified that error appears in the above-identified patent and that said Letters Patent is hereby corrected as shown below:

Column 11

Line 23, change 'transitory" to --transistor,--

Column 12, line 25, change "provident" to --providing--

Signed and Sealed this

Third Day of May, 1994

Attest:

BRUCE LEHMAN

Attesting Officer           Commissioner of Patents and Trademarks